H. O. WURMSER.
STARTING DEVICE FOR GAS OR EXPLOSIVE ENGINES.
APPLICATION FILED MAR. 28, 1910.
1,007,170.
Patented Oct. 31, 1911.
2 SHEETS—SHEET 2.
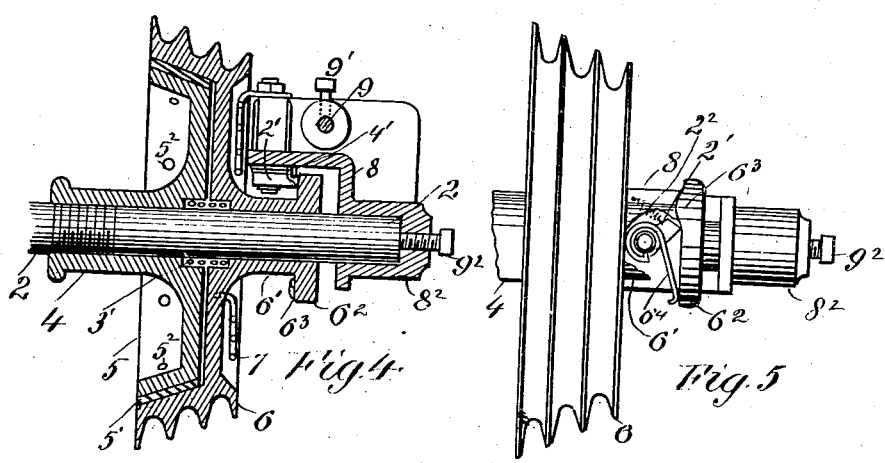
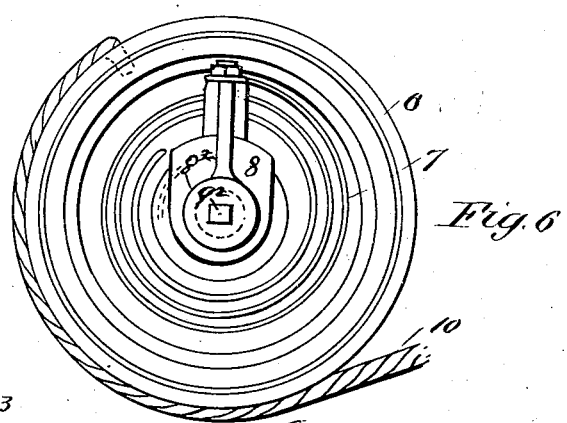
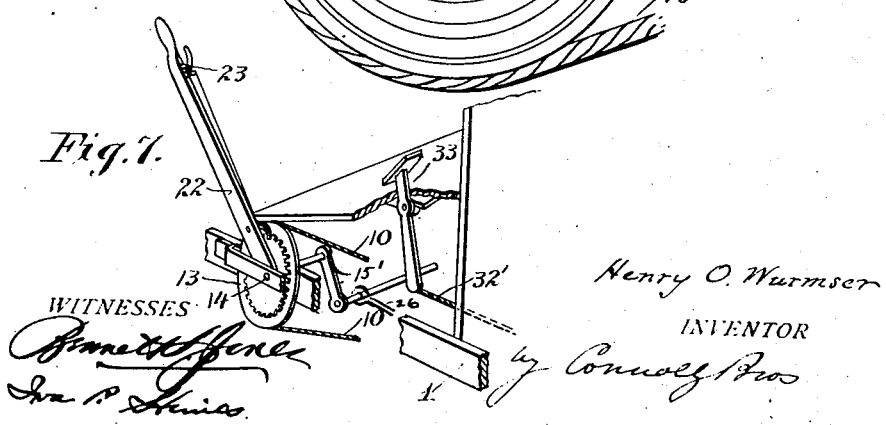

H. O. WURMSER.
STARTING DEVICE FOR GAS OR EXPLOSIVE ENGINES.
APPLICATION FILED MAR. 28, 1910.
1,007,170.
Patented Oct. 31, 1911.
2 SHEETS—SHEET 1.
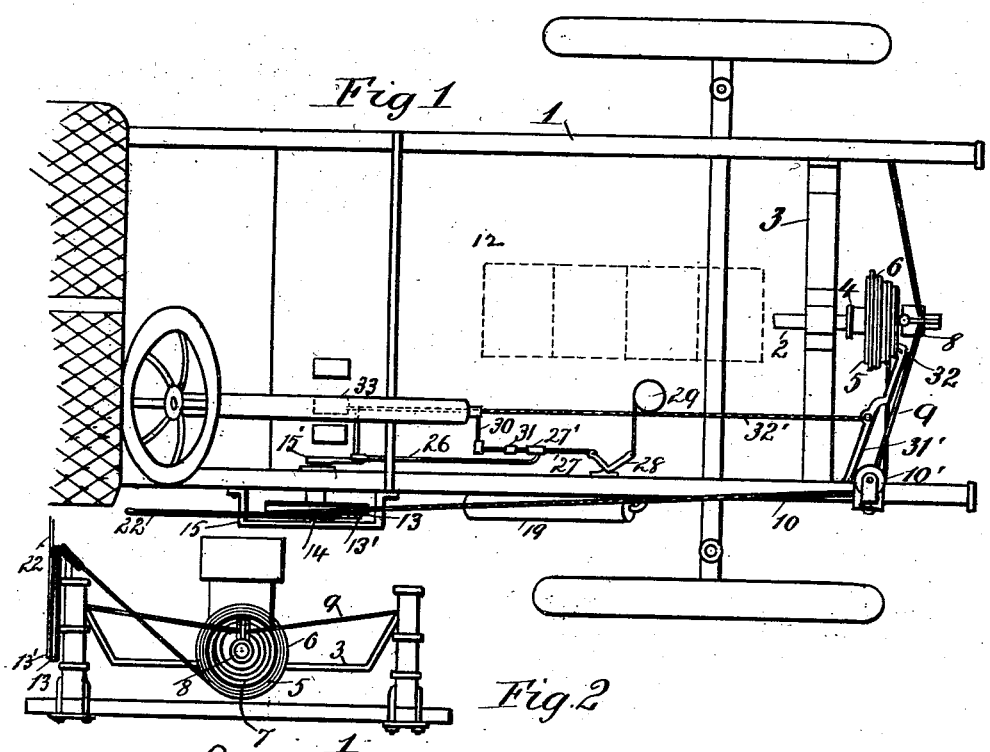
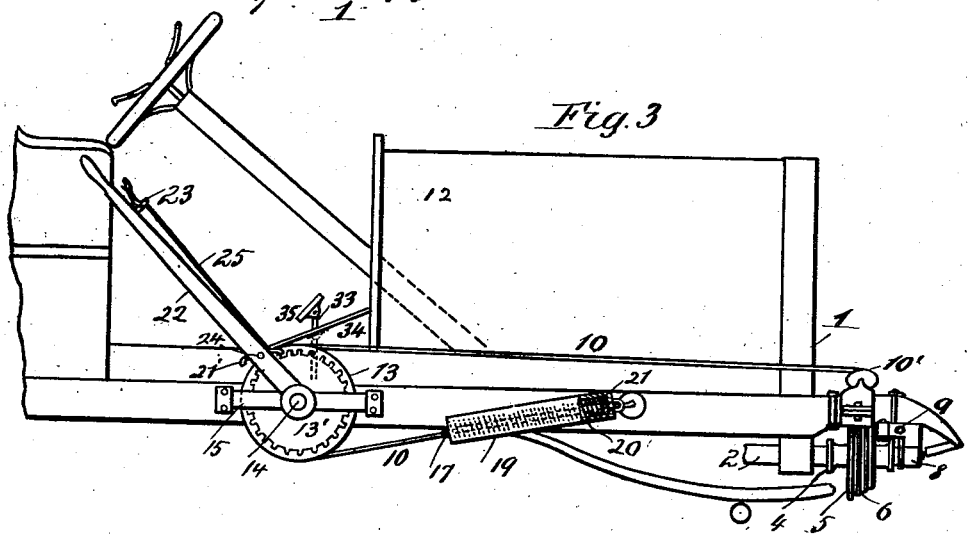
WITNESSES
Henry O. Wurmser
INVENTOR
Attorneys

UNITED STATES PATENT OFFICE.

HENRY O. WURMSER, OF LORAIN, OHIO.

STARTING DEVICE FOR GAS OR EXPLOSIVE ENGINES.

1,007,170.   Specification of Letters Patent.   Patented Oct. 31, 1911.

Application filed March 28, 1910. Serial No. 551,873.

*To all whom it may concern:*

Be it known that I, HENRY O. WURMSER, a citizen of the United States, residing at Lorain, in the county of Lorain and State of Ohio, have invented certain new and useful Improvements in Starting Devices for Gas or Explosive Engines, of which the following is a specification, reference being had therein to the accompanying drawing.

This invention has relation to means for starting or "cranking" gas or explosive engines and is especially applicable to automobiles or other vehicles driven by gas or explosive engines.

The object of the invention is to allow the driver to start or "crank" the engine while he is seated on the vehicle and the invention consists in the provision of means whereby the necessary operations for cranking the engine and controlling the sparking device may be performed through the medium of a suitable starting lever located adjacent to the driver's seat and through the medium of a foot lever or pedal within convenient reach of the driver's foot.

My present invention relates to certain modifications and improvements in the subject matter of my application for a Patent No. 541,381, filed February 1, 1910.

In the accompanying drawing I have illustrated my invention as applied to an automobile of the usual type and: Figure 1 is a plan view of a portion of an automobile with the starting or cranking device embodying my invention. Fig. 2 is a front elevation of the same. Fig. 3 is a side elevation of part of an automobile to which my improvements are applied. Fig. 4 is a vertical sectional view of the cranking wheel of the power shaft. Fig. 5 is an under side view of the device shown in section in Fig. 4. Fig. 6 is a face view of the same with attached spring. Fig. 7 is a perspective view of a portion of the starting or cranking mechanism.

The forward part of the frame and running gear of the automobile shown in Figs. 1 and 2, is designated 1 and needs no specific description.

2 designates the crank shaft of the engine running lengthwise centrally of the frame, and mounted at its forward end on the cross beam 3. The shaft 2 is screw threaded and screwed into a threaded collar 4, forming part of a conical clutch member 5.

6 designates a cranking wheel which is loosely mounted on the forward section of the shaft 2, so as to be adjustable lengthwise of the shaft, and has a rearwardly projecting hollow conical rim surrounding said clutch member 5. By sliding the wheel 6 upon the shaft 2, it is brought into and out of actuating connection with the conical clutch member 5, secured to said shaft 2. A flat coiled or helical spring 7 is mounted on the outer face of the wheel 6, the outer end being secured on top of bracket 8 carried by a brace rod 9 of the vehicle, and the inner end secured in a hole in wheel 6.

The periphery of the clutch member 5 is covered with leather 5', secured in place by copper rivets $5^2$, for the purpose of increasing friction between the two clutch members.

The periphery of the wheel 6 is grooved to receive a rope, chain or cable 10 which is secured at one end in a hole in the wheel and passes from said wheel to and around a pulley 10', mounted at one of the front corners of the vehicle and thence continues back at the side of the vehicle to a point in the rear of the engine hood 12. At this point a combined pulley and ratchet wheel 13, 13', is mounted on a horizontal axis at the side of the vehicle, its short horizontal shaft 14 being journaled outside the wheel 13, in a cleat or bracket 15, bolted to the main frame of the vehicle and journaled on the inner side of the wheel 13, in the side bar of the main frame of the vehicle. The wheel 6 has several grooves on its periphery, of different diameters, to be utilized for securing the proper leverage for large or small H. P. engines.

The rope, chain or cable 10 passes over, around and under the pulley 13, and at its lower end is attached to a rod 17, which passes axially through the end of and into a cylindrical casing 19, and through a strong coiled spring 20, contained in said casing. At its forward end, the rod 17, carries a head 21, which bears against the end of the spring 20. The casing 19 is secured to the side of the main frame of the vehicle and the spring 20 is compressed therein when the rod is pulled, through the medium of the rope, chain or cable 10.

The combined pulley and ratchet wheel 13, 13' is loose upon the shaft 14 but is brought into engagement therewith by means of the double ended dog 21', carried by the upright lever 22, which is keyed or otherwise rigidly attached to the shaft 14.

A spring controlled latch 23 is pivoted to the upper part of the lever 22, in position so that it can be grasped easily and conveniently by the driver while manipulating the lever 22. The latch 23 is connected to the dog 21' forward of its pivotal point, by a rod 25.

The shaft 14 has keyed on its inner end a crank arm 15' which is connected by a rod 26 to a sleeve 27' on the rod 27 which is connected at its forward end to one limb of a bell crank 28, the other limb of said bell crank being connected to the spark timer 29. The rod 27 is coupled at its rear end to a laterally projecting arm 30, which in turn is connected in the usual manner to a lever on the steering wheel and rod 27 has mounted on it a nut 31, against which the sleeve 27' strikes, causing the rod 27 to move back and retard the spark, when the sleeve 27' is slid back on the rod 27 by the movement of the crank arm 15' and rod 26 when operated by the lever 22 and connections.

31' designates a lever arm pivoted to the frame of the vehicle at one side near the forward end, and having a forked head 32 carrying an anti-friction wheel which bears against the wheel 6. This lever is connected at its middle part by a rope or other suitable connection 32' to the lower end of a pedal lever 33, pivotally mounted on the foot board 34, and provided with a pedal 35, which is pressed forward and downward to draw the cranking wheel back into clutch engagement with the crank shaft of the engine.

The operation of the starting mechanism so far described is as follows: Assuming the starting lever 22 to be in the position shown in Fig. 3, and the dog 21' in engagement through its forward end with the teeth of the ratchet wheel 13', the cranking wheel 5, is then out of clutch engagement with the shaft of the engine. The lever 22, is now thrown forward as far as possible and the wheels 13, 13' thereby partially rotated forward. The cord or cable 10 is thus relaxed and the tension on the wheel 6, relieved, whereupon the wheel 6 rotates backward under the impulse of its spring 7 and winds up on its periphery the slack of the cable 10. At the same time the spark is retarded by the movement of the crank 15', rod 26 and sleeve 27' and the spring 20 compressed by the pull of the lower length of the cable 10. The pedal 35 is now operated by the foot of the driver and the wheel 6 pulled back into clutch engagement with the clutch member 5 on the engine shaft, through the operation of the shifting lever 31', and connection 32'. The dog 21' is now brought into reverse engagement with the ratchet wheel by means of the latch 23 and the operating lever pulled back. This operation reverses the wheels 13, 13' and by consequently unwinding the cord or cable 10 from the wheel 6 rotates the latter forward, such rotation being assisted by the expansion pull of the spring 20. The partial rotation of the crank shaft of the engine thus produced is sufficient to start the engine. If this starting does not immediately occur, the operations just described may be repeated.

My present invention comprises means for disengaging the two clutch members 5 and 6, should back firing occur in the cylinder of the engine immediately upon cranking. For this purpose the hub 6' of the wheel 6 is prolonged axially and formed or provided at its outer end with a circular flange $6^2$ on the inner face of which there is provided a wave like cam projection $6^3$. The overhanging bracket 8 has pivoted to its under surface above the shaft 2, a dog 2' to which is connected a retractile spring $2^2$, which serves to prevent the dog from swinging so far around as to present its back to the disk when the clutch members are separated. The tendency of the spring $2^2$ is to pull the dog away from the disk, but this tendency is overcome by the action of the spring $6^4$, the extended end if which coming into contact with the face of the disk $6^2$ causes the dog to bear against the disk. Between the two clutch members 5 and 6 is located a powerful spiral spring 3', seated in sockets in the opposing faces of the members 5 and 6, and this spring tends to keep the clutch members separated, but is strongly compressed when the members 5 and 6 are in engagement. When, through the operation of the lever 31', rope 32', and pedal lever 33, the wheel 6 is moved back on shaft 2, into engagement with the clutch member 5, so that the crank shaft may be rotated, the flange $6^2$ presses against the free angular end of the dog 2' forcing the latter rearwardly on its pivot. In this position, should there be no back fire, the wheel 6 will rotate in the proper direction for effective cranking without being impeded. If, however, back firing occurs resulting in a reverse rotation of the crank shaft, and wheel 6, the dog 2' will be caused to catch or bite the inner surface of the flange $6^2$, by reason of being straightened out in the axial direction of the crank shaft and will immediately force the wheels 5 and 6 apart and prevent anything occuring to the other parts of the starting mechanism, thus leaving the cranking operation to be repeated. The dog 2' is held in contact with the flange $6^2$, by the pressure of the flange against the end of a spring $6^4$, which is wound around and secured to the hub of the dog 2'.

In the event of the dog failing to act, the cam projection $6^3$ on the flange $6^2$ will come in contact with a projection 4' on the bracket 8, and in passing the latter will cause the wheel 6 to be drawn out of engagement with the clutch member 5. The projection 4' will not act on the forward movement of the wheel 6, by reason of the fact that in such forward movement the wheel 6 makes only a partial revolution.

The forward end of the shaft 2 has its bearing in a box $8^2$ formed in the bracket 8 and the bracket is sustained in position, as before described, on the brace rod 9, a set screw 9', serving to hold the bracket in position on the brace rod which latter passes through a hole in the bracket. An adjusting screw $9^2$ passes through the bracket opposite the center of the box $8^2$ and serves to adjust the bracket and the parts carried thereby, relatively to the clutch members. The projecting end of the crank arm 15', is prolonged so as to engage the lower end of the pedal lever 33, so that on making the backward stroke of the starting lever 22 the pedal lever 33 will be struck by the prolonged end of the crank arm 15', and jar the foot lever and this will warn the operator to release his foot pressure from the pedal lever. The clutch members 5 and 6 are brought into engagement by the depression of the pedal lever 33, and it is necessary that this lever should be released on the backward movement of the lever 22, to disengage the clutch members and to prevent the engine from being reversed by the backward pull of the starting lever. The operator is warned by the crank arm striking the pedal lever, to release the same as otherwise he may neglect to do so.

I claim:

1. In a device of the character described, the combination of an engine shaft, a clutch member carried by said shaft, a cranking pulley movable on the engine shaft longitudinally thereof, and constituting a clutch member, said pulley being provided with a collar, a coiled spring connected to said pulley and to the engine frame, a flexible member wrapping around said pulley, means for actuating said flexible member to turn said pulley, means for moving said pulley longitudinally of said engine shaft and means comprising a dog mounted on a stationary part of the structure, a spring arm connected to the dog and adapted to bear against the face of the collar carried by said pulley and bring the dog into engagement with said collar for positively and automatically separating the clutch members on reversal of the engine shaft.

2. The combination, in an automobile, of an explosion engine, a rocking lever located adjacent the operator's seat, a shaft on which said lever is mounted, a crank on the end of said shaft, a cranking pulley carried on the engine shaft, means for imparting movement from said lever to said cranking pulley and means for shifting said cranking pulley lengthwise of its shaft to throw it into and out of operative engagement with the shaft, comprising a foot lever, a shifting lever engaging said cranking pulley and a connection between said shifting lever and said foot lever, said crank being provided with an arm adapted to strike the foot lever at one position of the rocking lever.

In testimony whereof I affix my signature in presence of two witnesses.

HENRY O. WURMSER.

Witnesses:
C. E. VAN DEUSEN,
A. C. CALHOON.